(12) United States Patent
Boling et al.

(10) Patent No.: US 12,492,891 B2
(45) Date of Patent: Dec. 9, 2025

(54) NON-CONTACT OPTICAL MEASUREMENT DEVICES AND EXCHANGEABLE OPTICAL PROBES

(71) Applicant: DWFRITZ AUTOMATION, LLC, Wilsonville, OR (US)

(72) Inventors: Shawn A. Boling, Wilsonville, OR (US); Bhaskar Ramakrishnan, Wilsonville, OR (US); Derek Graham Aqui, Wilsonville, OR (US); Chris Barns, Wilsonville, OR (US)

(73) Assignee: Industrial Metrology Solutions LLC, Mebane, NC (US)

( * ) Notice: Subject to any disclaimer, the term of this patent is extended or adjusted under 35 U.S.C. 154(b) by 75 days.

(21) Appl. No.: 17/753,972

(22) PCT Filed: Sep. 18, 2020

(86) PCT No.: PCT/US2020/051475
§ 371 (c)(1),
(2) Date: Mar. 18, 2022

(87) PCT Pub. No.: WO2021/055736
PCT Pub. Date: Mar. 25, 2021

(65) Prior Publication Data
US 2022/0373323 A1 Nov. 24, 2022

Related U.S. Application Data

(60) Provisional application No. 62/902,311, filed on Sep. 18, 2019.

(51) Int. Cl.
*G01B 11/24* (2006.01)
*G01B 9/02015* (2022.01)
(Continued)

(52) U.S. Cl.
CPC ...... *G01B 11/2441* (2013.01); *G01B 9/02015* (2013.01); *G01B 11/12* (2013.01); *G01B 11/2518* (2013.01); *G01B 9/0209* (2013.01)

(58) Field of Classification Search
CPC ..... G01B 11/12; G01B 11/24; G01B 11/2441; G01B 11/2518; G01B 9/0209; G01B 9/02015; G01B 11/30
See application file for complete search history.

(56) References Cited

U.S. PATENT DOCUMENTS

| 5,781,297 A | 7/1998 | Castore |
| 6,668,466 B1 * | 12/2003 | Bieg ............ G01B 5/008 33/503 |

(Continued)

FOREIGN PATENT DOCUMENTS

| CN | 101802542 A | 8/2010 |
| CN | 107037444 A | 8/2017 |

(Continued)

OTHER PUBLICATIONS

FIONEC GMBH, "Fiber optic precision sensor technology FDM series", product brochure, Mar. 18, 2022, 4 pages.
(Continued)

*Primary Examiner* — Uzma Alam
*Assistant Examiner* — Justin J Van Cleave
(74) *Attorney, Agent, or Firm* — Corinne R. Gorski

(57) ABSTRACT

Disclosed is a non-contact optical measurement device for detecting or measuring different geometric workpiece features based on configurable light-propagation paths of light emitted from a light source and reflected by a workpiece surface for incidence upon a spectral sensor. The light-propagation paths are configurable based on which optical probe is attached to a rotation stage that rotates the probe about an optical axis and in a collimated region.

14 Claims, 11 Drawing Sheets

(51) Int. Cl.
*G01B 9/0209* (2022.01)
*G01B 11/12* (2006.01)
*G01B 11/25* (2006.01)

(56) References Cited

U.S. PATENT DOCUMENTS

| | | | |
|---|---|---|---|
| 7,625,335 | B2 | 12/2009 | Deichmann et al. |
| 10,036,629 | B2* | 7/2018 | Bondurant ............. G01B 11/24 |
| 10,598,521 | B2 | 3/2020 | Aqui et al. |
| 11,054,242 | B2 | 7/2021 | Hariyama et al. |
| 2010/0149525 | A1* | 6/2010 | Lau ........................ G01B 5/012 |
| | | | 356/139.03 |
| 2012/0204436 | A1* | 8/2012 | Raab ...................... G01B 7/008 |
| | | | 33/503 |
| 2013/0314689 | A1 | 11/2013 | Jones et al. |
| 2013/0314690 | A1* | 11/2013 | Jones .................. G01B 21/047 |
| | | | 359/615 |
| 2015/0211850 | A1* | 7/2015 | Harsila ................ G01B 21/047 |
| | | | 356/4.01 |
| 2018/0017499 | A1 | 1/2018 | Monchalin et al. |
| 2018/0156595 | A1* | 6/2018 | Kay ........................ G02B 7/14 |
| 2019/0154430 | A1 | 5/2019 | Weston et al. |
| 2019/0277628 | A1* | 9/2019 | Motohashi ........... G01B 9/0209 |
| 2020/0166327 | A1 | 5/2020 | Hariyama et al. |

FOREIGN PATENT DOCUMENTS

| | | | |
|---|---|---|---|
| EP | 2977715 A | 1/2016 | |
| JP | 2013246173 A | 12/2013 | |
| JP | 2018205301 A | 12/2018 | |
| JP | 2019522213 A | 8/2019 | |
| JP | 2020085717 A | 6/2020 | |
| WO | WO-2006112315 A1 * | 10/2006 | ............. G01B 11/24 |
| WO | 2006114627 A1 | 11/2006 | |
| WO | WO-2006128733 A2 * | 12/2006 | ........... G01B 11/007 |
| WO | 2018020244 A1 | 2/2018 | |
| WO | 2018106368 A1 | 6/2018 | |

OTHER PUBLICATIONS

FIONEC GMBH, "Fiber optic probes and components", product brochure, Mar. 18, 2022, 4 pages.
FIONEC GMBH, "Surface Roughness Measuring Station RMP", product brochure, 2017, 3 pages.
Novacam Technologies Inc., "Boreinspect system", product sheet, Apr. 30, 2021, 5 pages.
Novacam Technologies Inc., "Tubeinspect system", product sheet, Mar. 11, 2021, 4 pages.

* cited by examiner

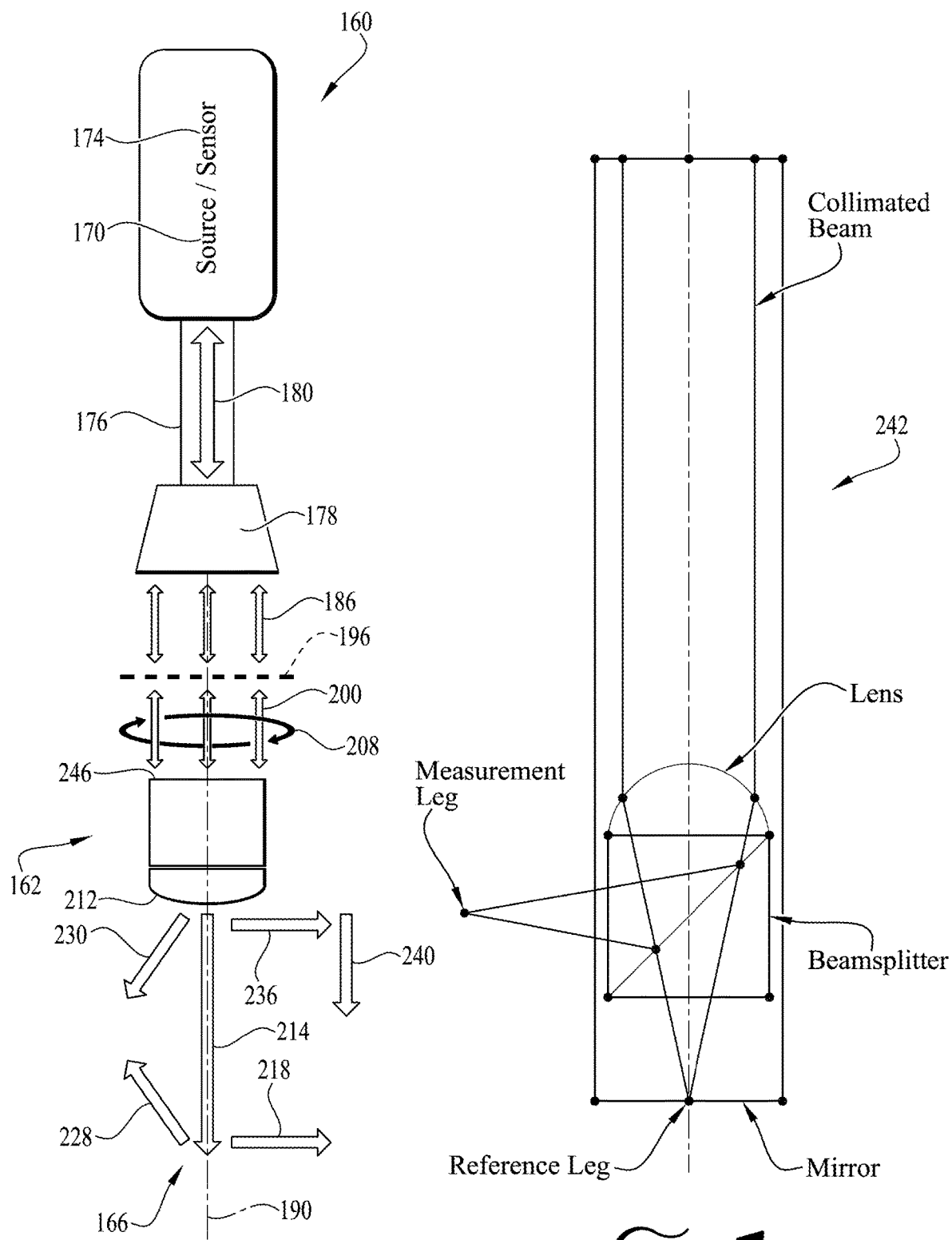

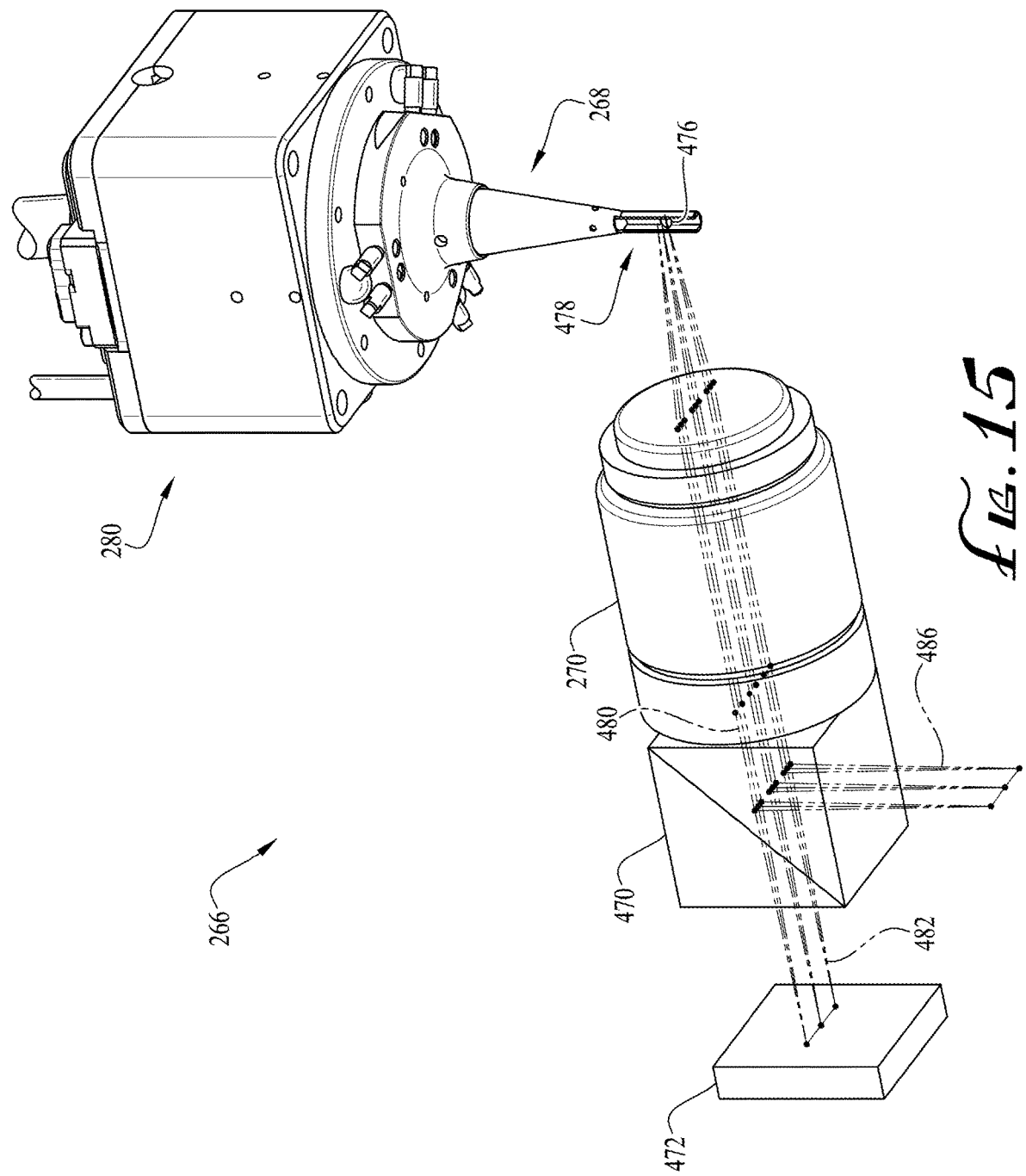

NON-CONTACT OPTICAL MEASUREMENT DEVICES AND EXCHANGEABLE OPTICAL PROBES

RELATED APPLICATION

This application is a National Stage of International Application No. PCT/US2020/051475, filed Sep. 18, 2020, which claims priority benefit of U.S. Provisional Patent Application No. 62/902,311, filed Sep. 18, 2019, which are hereby incorporated by reference in their entireties.

TECHNICAL FIELD

This disclosure relates generally to metrology devices, and, more particularly, to non-contact optical measurement devices for various inspection tasks including dimensional measurement, surface roughness measurement, and geometric feature scanning.

BACKGROUND INFORMATION

U.S. Pat. No. 5,781,297 of Castore describes a mixed frequency and amplitude modulated fiber optic heterodyne interferometer for distance measurement. The beam from a frequency modulated laser diode is split into reference and target beams. A closed loop control system modulates the amplitude of the reference beam to maintain a balance between the power in the target return beam and the reference beam. This enables the sensor to operate with targets of widely varying reflectivity and across a broad range of angles of incidence of the target beam to the target. The reference and target return beams interfere at a detector producing a beat wave. The beat frequency is linearly related to the distance of the target from the sensor. The frequency of the beat wave is determined to high precision, thus giving the position to high precision.

U.S. Pat. No. 7,625,335 of Deichmann et al. describes a scanner for three-dimensional scanning of interior surfaces or cavities of limited dimensions or with restricted accessibility. The scanner includes a probe having an axis and at least one light source and one camera adapted to perform a scan 360° around the axis of the probe. Three-dimensional replicas of real objects may be created using 3-D scan data obtainable with the scanner.

U.S. Pat. No. 10,036,629 of Bondurant et al. describes an optical thread profiler that includes a CCD imager and optical triangulation to perform non-contact characterization of the threaded surface.

Other attempts at non-contact optical measurement devices include those from Novacam Technologies Inc. of Pointe Claire, Quebec and Fionec GmbH of Aachen, Germany.

SUMMARY OF THE DISCLOSURE

A non-contact optical measurement device for detecting or measuring different geometric workpiece features based on configurable light-propagation paths of light emitted from a light source and reflected by a workpiece surface for incidence upon spectral sensor, comprises a collimator configured to collimate the light emitted from the light source so as to establish collimated light directed along an optical axis; a rotational motion stage configured to engender rotational motion about the optical axis; a rotational motion sensor configured to track a controllable amount of rotation imparted by the rotational motion stage; and a set of exchangeable optical probes, each member of the set including a probe optic configuration that is different from those of other members of the set, and each member being detachably mountable to the rotational motion stage to direct the collimated light along a corresponding propagation path as the controllable amount of rotation is imparted to the probe optic configuration such that a reflected portion of the collimated light is directed toward the spectral sensor.

Also disclosed are fiber-optic bore inspection tools and free-space optics measurement devices by which to miniaturize optical probes for detecting or measuring various features including small-diameter bores. In some embodiments, a fiber-optic bore inspection tool includes a rotatable small-diameter cannula (i.e., a long needle) housing an optical fiber, also called a light pipe, within the cannula. A mirror located at a distal end of the cannula directs light emitted from the cannula such that the light is incident upon a bore surface. Reflected light is carried back through the light pipe to a light field camera optically associated with the light pipe (e.g., akin to a borescope). The camera receives the light so as to capture both two- and three-dimensional information.

Disclosed bore measurement methods are suitable for metrology measurement of hole inside diameter (ID), entire surface profiles, and evaluation of surface roughness and finish. Moreover, in some embodiments, interferometric methods can also be used to obtain the surface roughness or finish quality of an interior surface.

The disclosed techniques provide an advantage of capturing the internal features of small holes, with the capability of inspection of holes and bores smaller than six mm, including those with internal threads. There are many inspection applications for which the disclosed innovations are applicable, such as: cooling holes in aerospace engine blades; medical nail plates; head drive profiles on bone screws and dental implant heads; fuel injector holes and exhaust manifold bores; stent internal diameter inspection; and valves used in gas box and liquid delivery systems for oil and gas, boiler, and semiconductor equipment. In each of the aforementioned applications, hole diameters are sometimes less than six mm. In particular, aerospace and medical fields are markets in which small holes are present and could be readily inspected with the disclosed technology.

Additional aspects and advantages will be apparent from the following detailed description of embodiments, which proceeds with reference to the accompanying drawings.

BRIEF DESCRIPTION OF THE DRAWINGS

FIG. 4 is a block diagram of a non-contact optical measurement device configurable with a set of exchangeable optical probes, according to an embodiment.

FIG. 5 is an annotated side elevation view of an optical assembly in a probe tip, according to an embodiment.

FIG. 15 is an isometric view of the non-contact optical measurement device equipped with the first exchangeable optical probe as shown in FIGS. 7 and 8, configured with an f-theta lens for two-dimensional scanning, according to an embodiment.

DETAILED DESCRIPTION OF EMBODIMENTS

Figure 1:
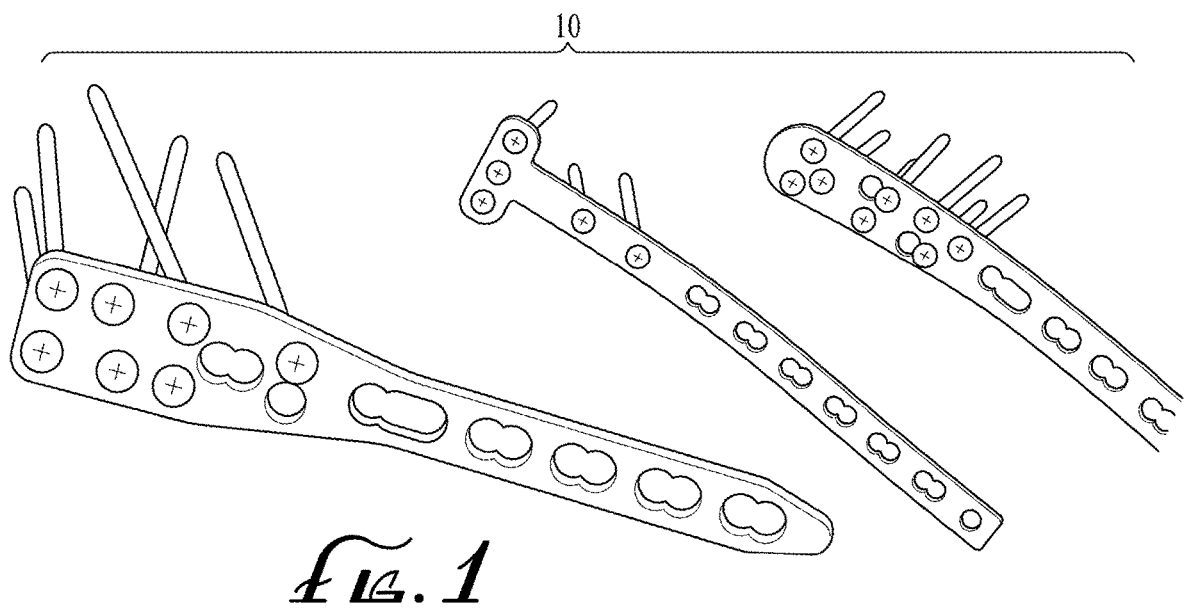
FIG. 1 is a set of perspective views of bone plates including multiple small threaded holes at compound angles.
Figure 2:
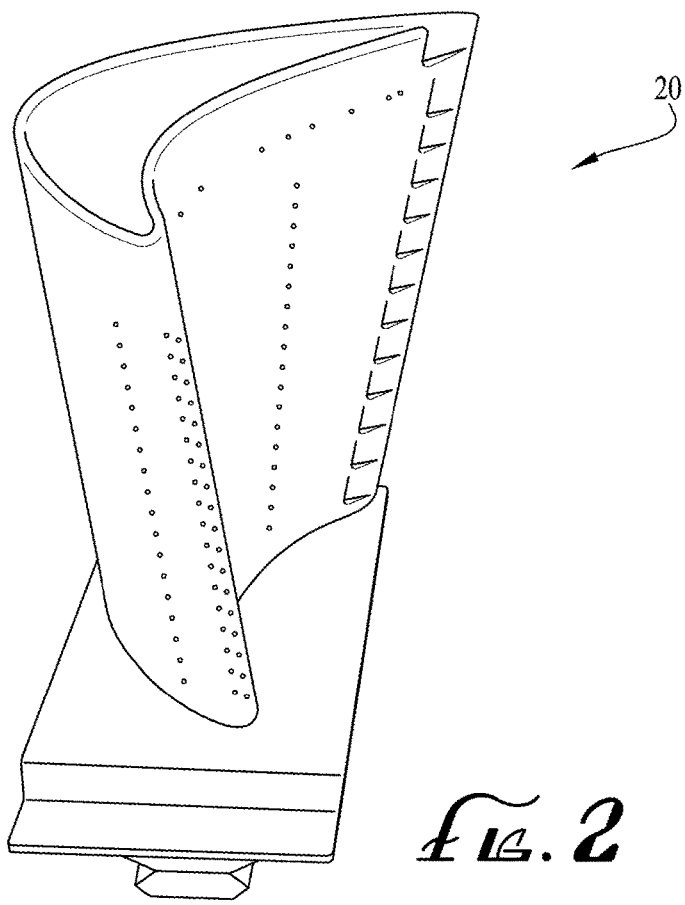
FIG. 2 is a perspective view of an aircraft engine blade with multiple holes of different cross-sectional shapes, angles, depths, and sizes in three-dimensional volume.

FIGS. 1 and 2 show examples of devices having multiple small bores, each of which is to be rapidly inspected. For example, FIG. 1 shows three bone plates 10. FIG. 2 shows an aircraft engine blade 20.

Figure 3:
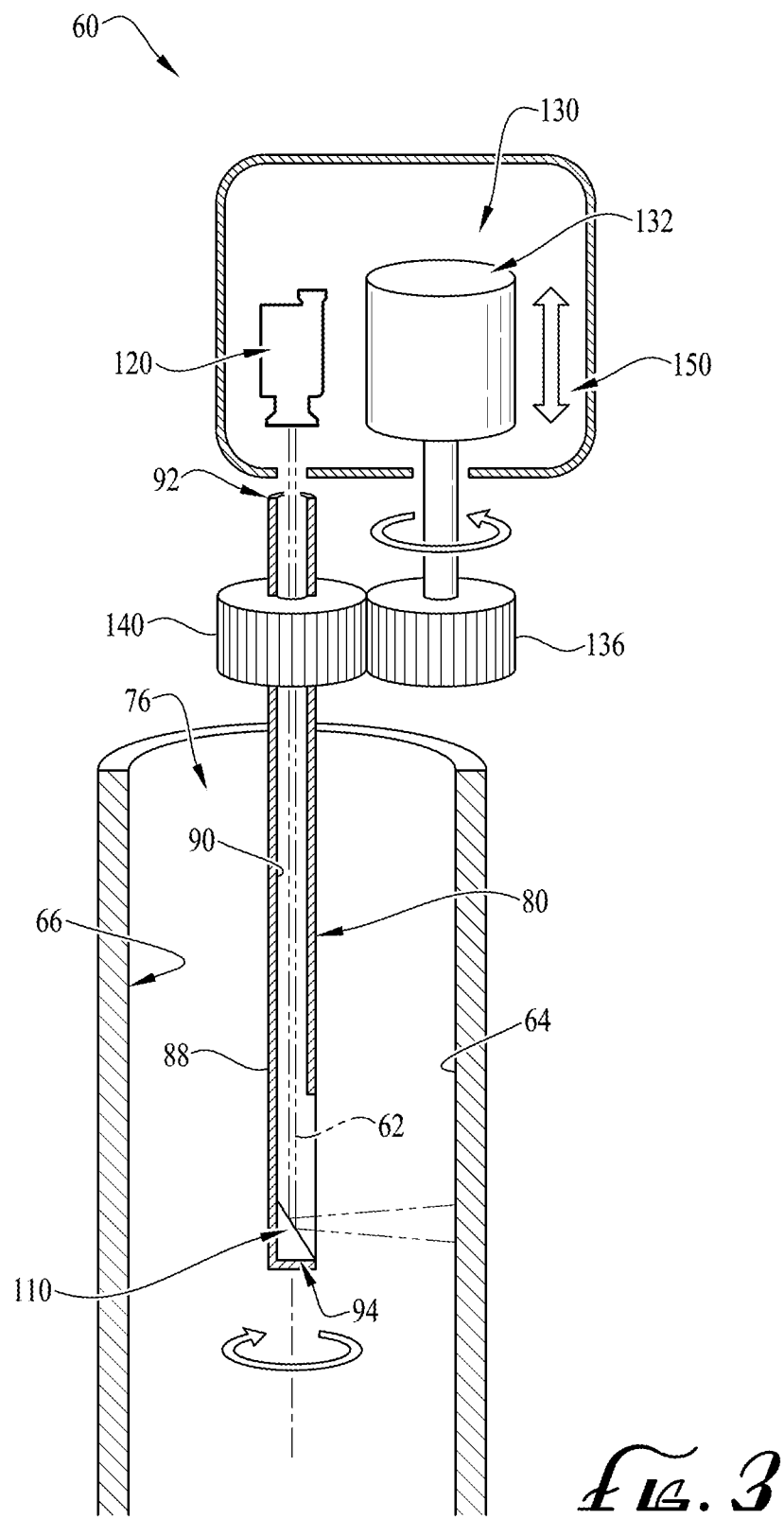
FIG. 3 is a hybrid block diagram and side elevation view of a fiber-optic bore inspection tool including a 45° mirror tip for measuring a cylindrical sidewall, according to an embodiment.

FIG. 3 shows a fiber-optic bore inspection tool 60 configured to apply a laser beam 62 to an inner surface 64 of a cylindrical sidewall 66 defining a bore 76 or other aperture under inspection. For example, inner surface 64 may be part of a tube defined by a stent, according to some embodiments.

Fiber-optic bore inspection tool 60 includes a rotatable, extendable, and swappable optical probe assembly 80. In some embodiments, optical probe assembly 80 includes a cannula 88 having an interior 90 through which laser beam 62 is conveyed from a proximal end 92 and a distal end 94 of cannula 88. Cannula 88 optionally houses an optical fiber (not shown) that guides laser beam 62 and receives light reflected from inner surface 64 of sidewall 66.

Figure 6:
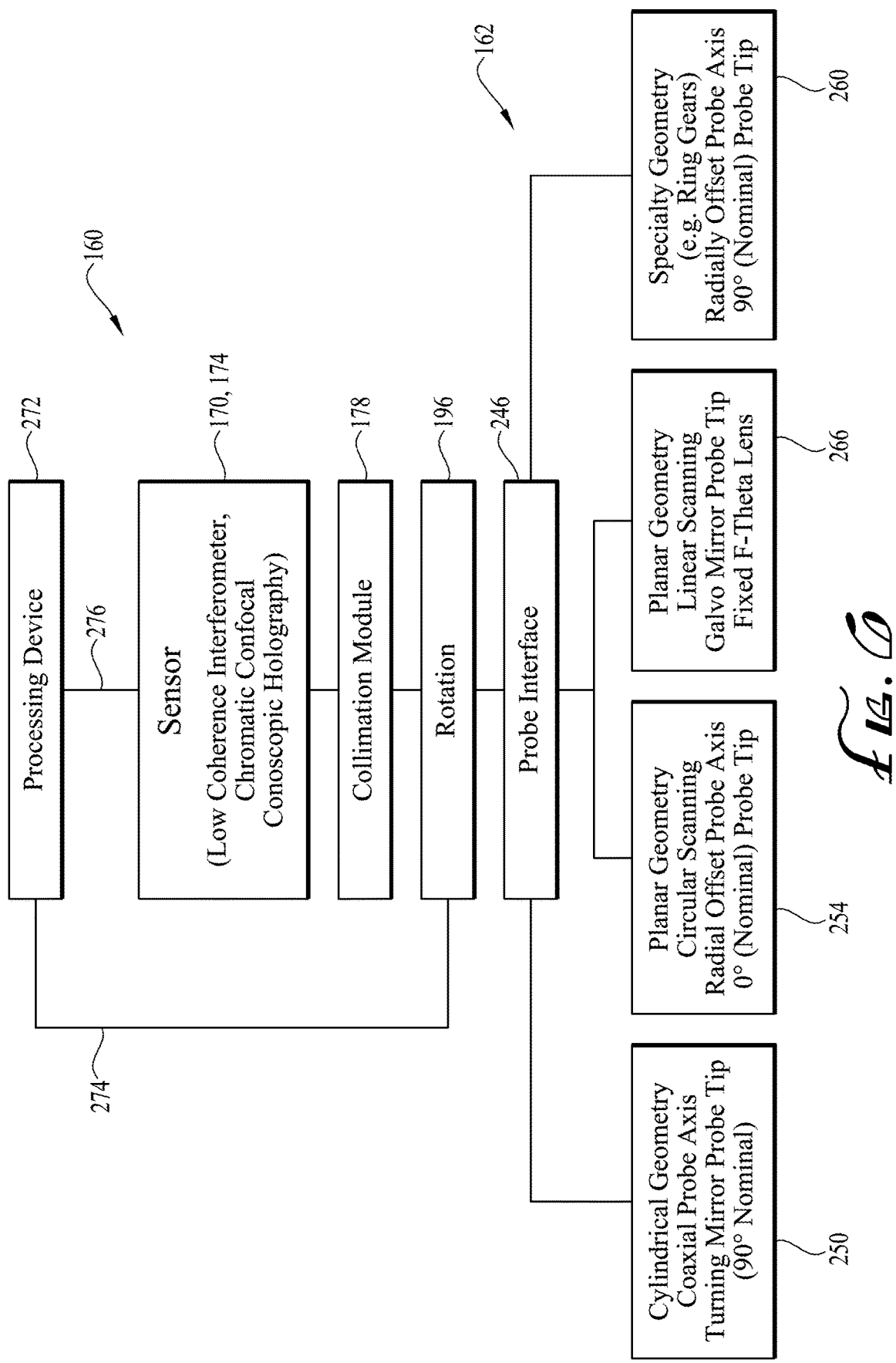
FIG. 6 is an annotated system block diagram, according to an embodiment.

In the example shown in FIG. 3, optics, such as a mirror 110, are mounted at distal end 94 so as to transversely redirect toward inner surface 64 light emitted axially by a laser source and collimation module (see, e.g., FIG. 6). Light reflected by inner surface 64 is then redirected by mirror 110 back along the axial direction.

The received and redirected light propagates through the optical fiber toward proximal end 92 of cannula 88, at which point the light is captured at a light sensor 120. In other embodiments, the optical fiber is substituted by free space, free space optics, multiple optical fibers, or a combination of these three.

With respect to sensors suitable for sensor 120, some embodiments may include an interferometer sensor. Accordingly, a phase change in laser beam 62 is used to obtain width distance measurements (i.e., inside diameter (ID) measurements), as measured from a position of mirror 110 to inner surface 64. In other embodiments, as explained later with reference to FIGS. 5 and 6, various technologies (e.g., conoscopic holography, low coherence interferometer (LCI), chromatic confocal, and others) may be employed to measure holes and other geometric features.

According to another embodiment, an optical switch is provided so that two or more sensors may be switched for two or more measurement technologies to be deployed (e.g., LCI, chromatic confocal, or other types) sequentially though a fiber coupled on an input side of the optical switch. This enables selection of the appropriate technology to a common optical collimation module on the output side of the switch.

To measure dimensions of a profile of inner surface 64 (including optional threads, in some embodiments), cannula 88 is rotatable and extendable. Skilled persons will appreciate that there are a variety of techniques for achieving relative motion between assembly 80 and inner surface 64. For instance, rotation is achieved with rotational actuator system 130. In one embodiment, a motor 132 rotates a first gear 136 that intermeshes with, and transfers rotational motion to, a second gear 140. Second gear 140 is coupled to cannula 88 so as to impart rotation. The amount of rotation is encoded, either in terms of rotation or arcuate distance, so that the information can be accurately mapped to an azimuthal location of features on inner surface 64. Similarly, a linear stage 150 provides for extension and retraction of cannula 88. The amount of linear movement is also encoded for mapping lengthwise positions of features detected or measured from inner surface 64. When rotational and linear movements are applied concurrently (e.g., while inserting or extracting optical probe assembly 80), a spiral inspection is performed.

Optical probe assembly 80 includes mirror 110 for inspection of inner surface 64 whereas another assembly has no such mirror. Accordingly, light is emitted and reflected axially for inspection of a bottom wall surface of a bore. Additional assemblies can be used for still other specialized inspection tasks such as inspection of undercuts.

In some embodiments, optical probe assembly 80 is a member of a set of swappable probe assemblies. For example, FIG. 4 shows a non-contact optical measurement device 160 configurable with a set of exchangeable optical probes 162, each with micro optics specific to its function to enable both configuration of optical measurement parameters and different physical beam delivery propagation paths to a measurement site. Thus, as different ones of optical probes 162 are exchanged, device 160 is configured for detecting or measuring different geometric workpiece features based on configurable light-propagation paths 166 of light emitted from a light source 170 and reflected by a workpiece surface for incidence upon a spectral sensor 174 (e.g., chromatic confocal, LCI, and other types of spectral sensors).

In some embodiments, light source 170 and spectral sensor 174 are a single module collectively referred to as a sensor. In other embodiments, light source 170 and spectral sensor 174 are separate modules. An example of light source 170 and spectral sensor 174 is a CHR 2 IT DW available from Precitec GmbH & Co. KG of Gaggenau, Germany. Additional examples are shown in FIG. 6. Other embodiments may employ laser light.

Light source 170 and spectral sensor 174 may be remotely located from, and fiber-optically coupled 176 with, a collimator 178 to provide relatively narrow infrared band (1.07-micron wavelength) light 180 between collimator 178 and light source 170 and spectral sensor 174. In some embodiments, light source 170 and spectral sensor 174 are not remotely located and reside in a common housing with collimator 178 and other components shown in FIG. 4. Yet other embodiments may employ free-space optics as a substitute for optical fiber 176. An example of optical fiber 176 is single mode fiber available from Precitec GmbH & Co. KG.

Collimator 178 receives light 180 emitted from light source 170 and forms collimated light 186 directed along an optical axis 190. Skilled persons will appreciate that collimated light 186 includes some divergence, e.g., due to diffraction, and the amount of divergence that is acceptable depends on the desired application. An example of collimator 178 is F260 APC-1064 available from Thorlabs, Inc. of Newton, New Jersey.

A rotational motion stage 196 is configured to engender rotational motion about optical axis 190. In other words, rotational motion is imparted in collimation space and after light 180 is sheared by collimator 178. Accordingly, the shearing allows complete 360° (or more) of free rotation in collimation space. Moreover, from the perspective of free-space optics fixed or mountable to rotational motion stage 196, a collimated beam 200 rotates as a rotational motion sensor 208 (e.g., encoder) is configured to track (directly or indirectly) a controllable amount of rotation imparted by rotational motion stage 196. For instance, tracking may include determining a rotational, an azimuthal angle, or any other form of position information that may be used to derive a spatial location at which spectral data has been acquired.

Among set of exchangeable optical probes 162, each member includes a probe optic configuration 212 that is different from those of other members of the set so that collimated beam 200 may be laterally offset from optical axis 190, directed at an angle relative to optical axis 190, or a combination of both laterally offset and angled. Thus, each probe 162 directs collimated light 200 along a corresponding propagation path as a controllable amount of rotation is imparted to a probe optic configuration such that a reflected portion of the collimated light is directed toward spectral sensor 174. Thus, measurement of specific geometric features is made possible through precision motion of exchangeable optical probes 162 relative to optical axis 190.

In the examples of FIG. 4, a first beam 214 is coaxial with optical axis 190 (e.g., for bore depth measurements). A second beam 218 is directed at 90° by a 45° mirror tip located at a distal end of the probe (see, e.g., FIGS. 5, 7, and 8). A third beam 228 is directed from the distal end at an upward intermediate angle (e.g., for measuring undercuts). A fourth beam 230 is directed from the proximal end at a downward intermediate angle. A fifth beam 236 is emitted from the proximal end at a right angle. A sixth beam 240 is laterally offset from optical axis 190 and directed downward (or at another angle). Lateral offset from rotational and optical axis is also referred to as radial offset.

In some embodiments, each type of beam propagation path is established by a different probe. In another embodiment, two or more beams may be provided by a common probe after reconfiguring its optics. For example, a mirror may be inserted to change from beam 214 to beam 218. Furthermore, skilled persons will appreciate that the term beam need not exclude a train of pulses generated while sampling surfaces.

A mounting apparatus 246 acts as a common interface for detachably mounting any selected member set of exchangeable optical probes 162 to rotational motion stage 196. Individual probe tips are thereby repeatably attachable with a common precision interface to a common rotational motion axis (coaxial with optical axis 190) using a physical retention technique, such as magnetic or vacuum coupling. The common interface also enables automated exchange of various probe tips.

In some embodiments, a high precision kinematic mount on a rotating face of rotational motion stage 196 enables both rotation of optical probe 162 relative to collimator 178 and automated exchange of probes 162. Accordingly, each member of set of exchangeable optical probes 162 is readily detachably mountable to rotational motion stage 196. Precise mounting, along with rotation in collimation space, minimizes the adverse effects of misalignment of an optical axis of the probe relative to optical axis 190 of sensor 174 and a rotational motion axis.

FIG. 5 shows an example in which, downstream of the collimation module, a probe tip 242 may be optically configured per the desired measurement specification. For example, in the case of LCI, this would include a beam splitter and mirror to form the reference leg of the interferometer within the probe tip as well as a spherical or aspherical focusing lens to take the collimated beam and focus it to a spot. For chromatic confocal, additional optics may be included to create dispersion. In the case of chromatic confocal, the probe tip may include a chromatic lens and a reflecting element. By placing the lens in the probe tip, close to the measurement site, a large numerical aperture can be achieved, leading to smaller spot size and improved resolution.

Figure 11:
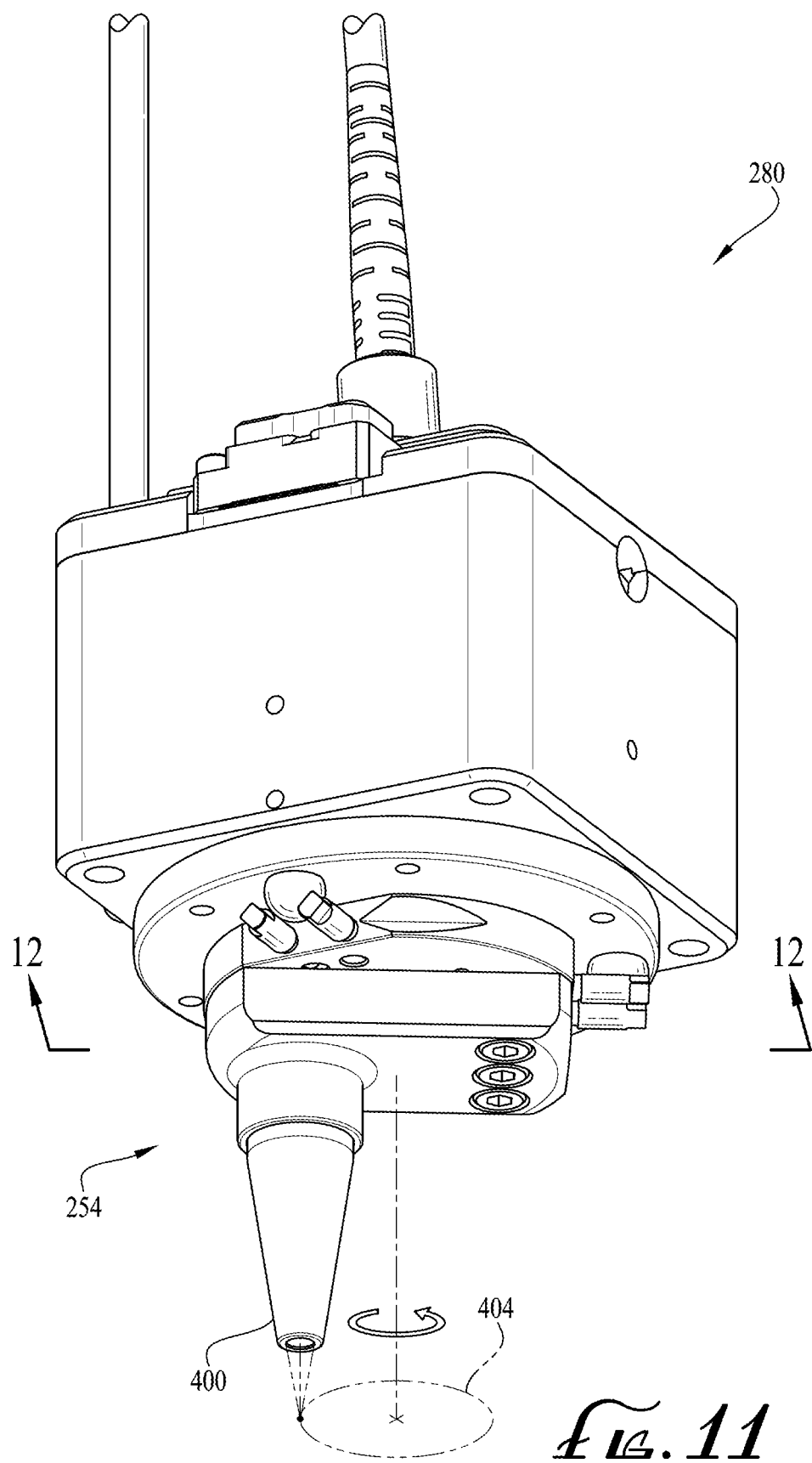
FIG. 11 is an isometric view of the non-contact optical measurement device of FIGS. 7 and 8 but equipped with a second exchangeable optical probe, according to an embodiment.
Figure 12:
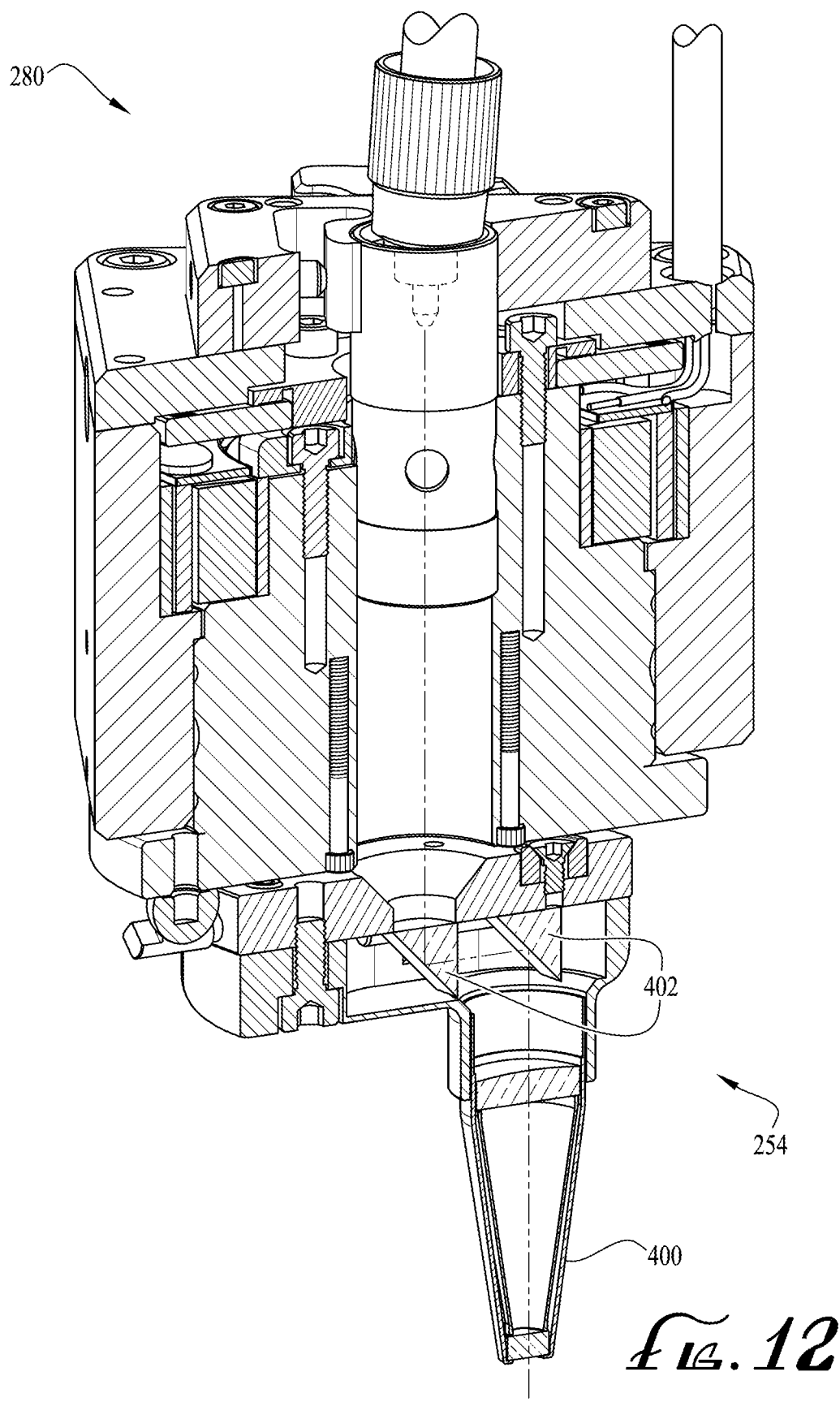
FIG. 12 is a section view taken along lines 12-12 of FIG. 11.
Figure 13:
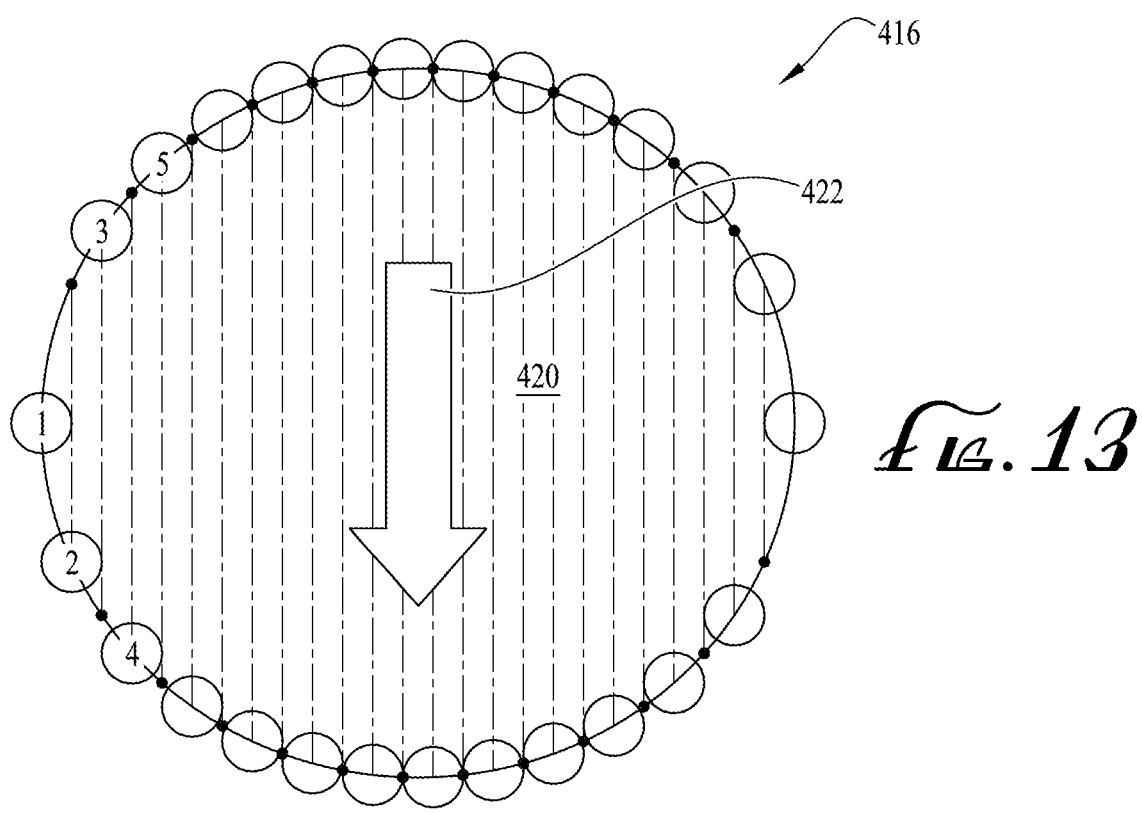
FIG. 13 is an annotated pictorial view of a point cloud for two-dimensional scanning using the non-contact optical measurement device configured with the second exchangeable optical probe of FIGS. 11 and 12.
Figure 14:
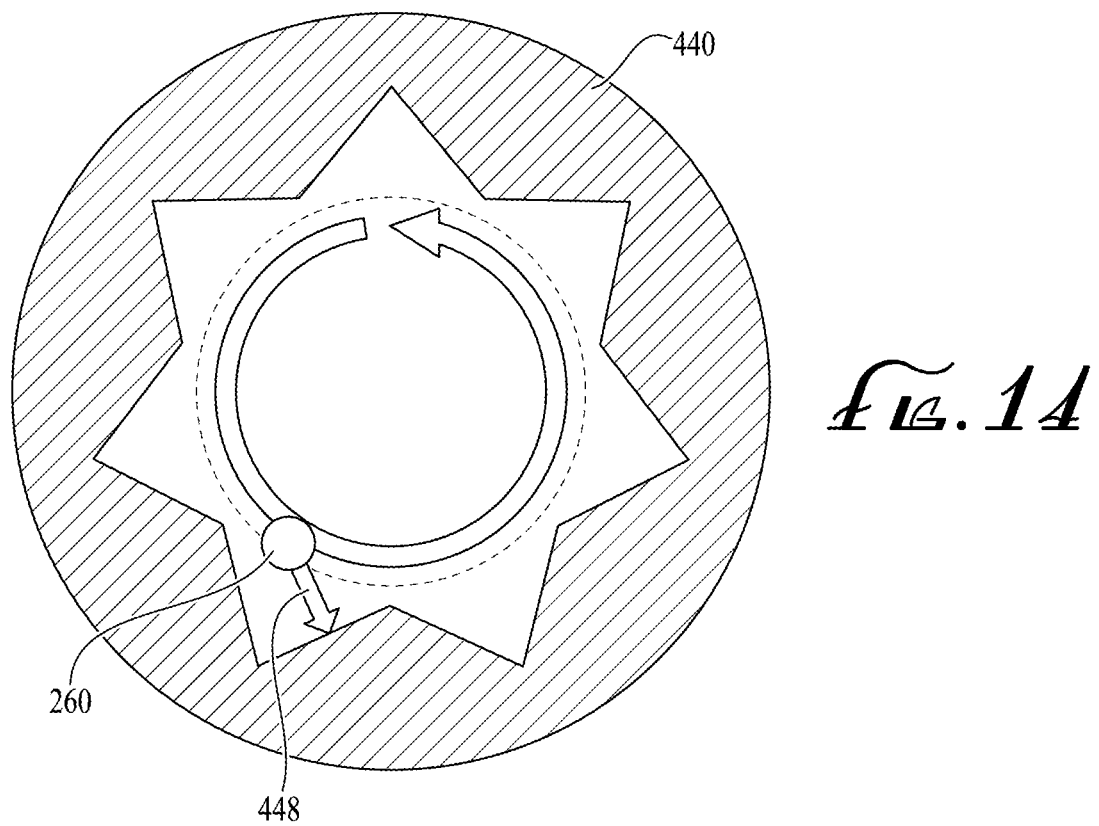
FIG. 14 is a top plan view of a third exchangeable optical probe performing an inspection of a ring gear.

FIG. 6 shows, in the form of a block diagram, non-contact optical measurement device 160. For conciseness, details of previously described components are not repeated, and additional details of probes 162 are annotated and described in connection with embodiments shown in FIGS. 7-15. For example, FIGS. 7-10 show an example of a probe 250 for measuring cylindrical geometries using a coaxial probe axis and a turning mirror probe tip; FIGS. 11-13 show an example of a probe 254 for measuring planar geometries using circular scanning and a downward directed, radially offset probe axis; FIG. 14 shows an example of a probe 260 for measuring multi-faceted geometries using a laterally directed (or angled), radially offset probe axis; and FIG. 15 shows an example of a system 266 including a probe 268 and an f-theta lens 270 for measuring planar geometries using linear scanning and a galvo-adjustable probe tip mirror (e.g., a modified version of probe 254). Complex geometries are measurable when rotational and spectral information is acquired using, in seriatim, different members of set of exchangeable optical probes 162.

FIG. 6 also shows a processing device 272 to generate an image or point cloud (see, e.g., FIGS. 9 and 10) of a geometric surface based on position information 274 from rotational motion sensor 208 (FIG. 5) and spectral information 276 from spectral sensor 174. Processing device 272 may be embodied as a remotely located general purpose computer, workstation, embedded processing computer executing a real-time operating system, custom ASIC, FPGA, GPU, or other device configured to read instructions from a machine-readable or computer-readable medium (e.g., a non-transitory machine-readable storage medium) and perform any one or more of the methods described herein. In some embodiments, processing device 272 includes one or more processors (or processor cores), one or more memory/storage devices, and one or more communication resources, each of which may be communicatively coupled via a network or bus.

Figure 7:
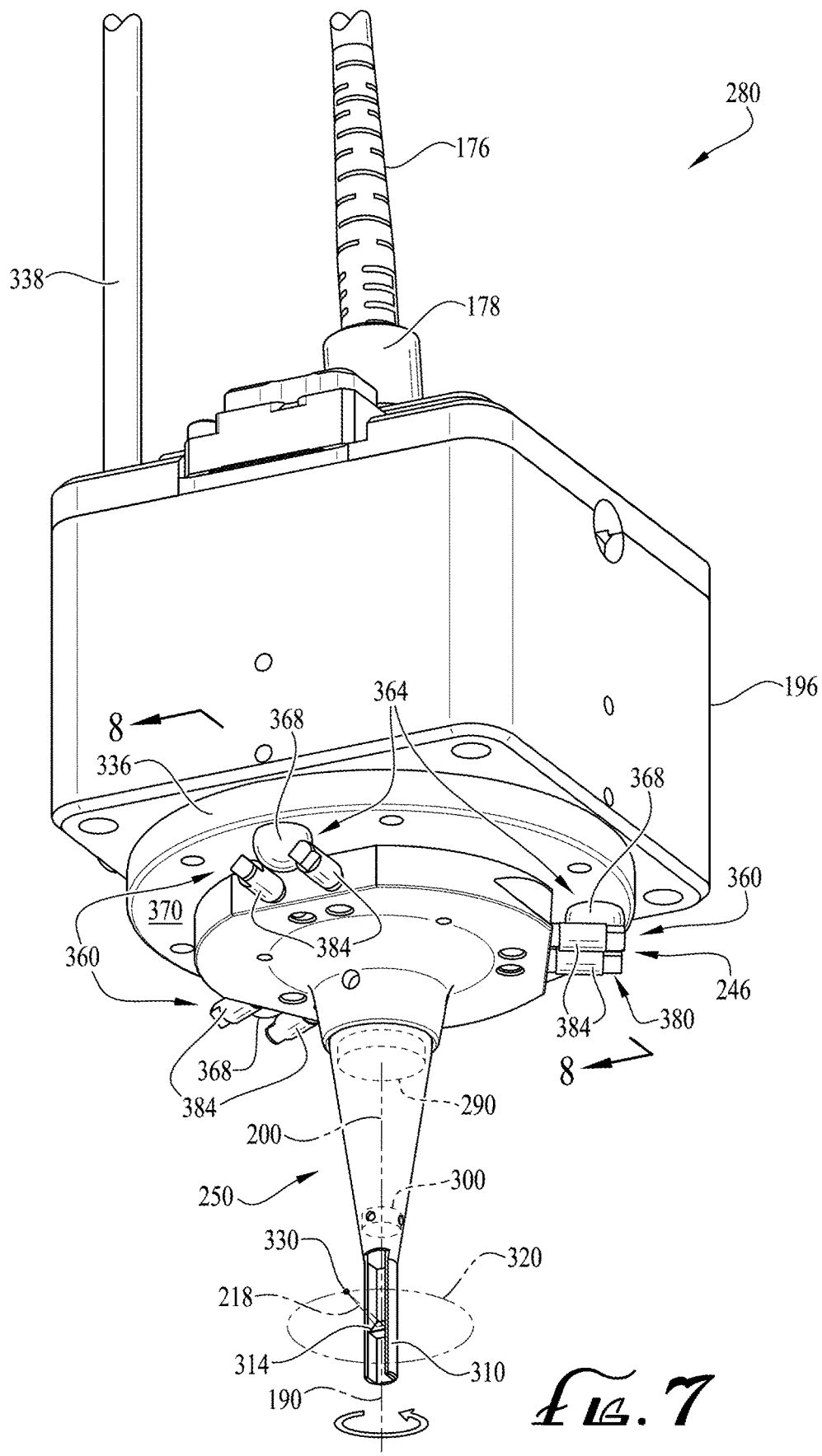
FIG. 7 is an isometric view of a non-contact optical measurement device configured with a first exchangeable optical probe, according to an embodiment.
Figure 8:
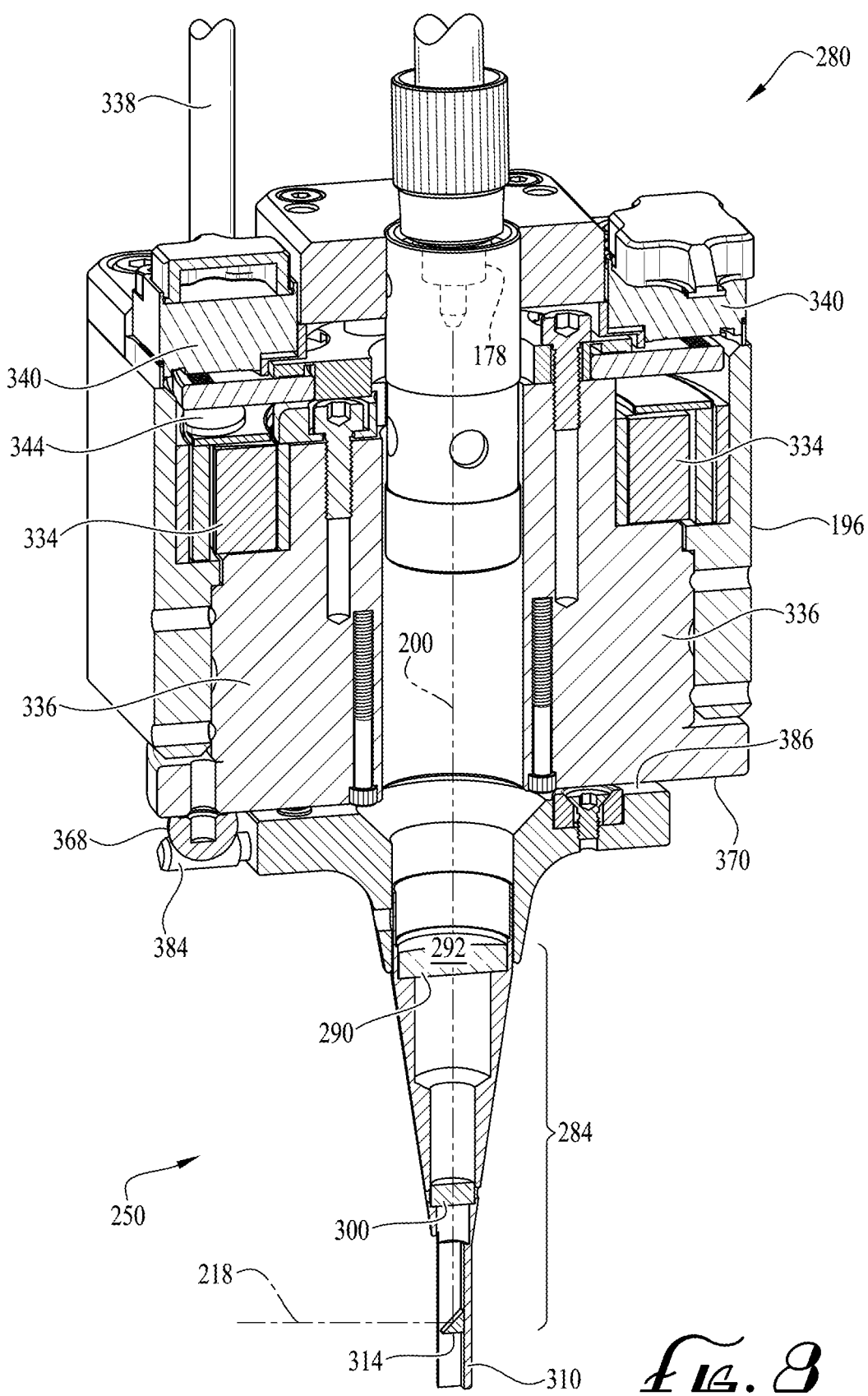
FIG. 8 is a section view taken along lines 8-8 of FIG. 7.

FIGS. 7 and 8 show a non-contact optical measurement device 280 equipped with probe 250 that FIG. 8 shows includes a probe optic configuration 284 including a focusing lens 290 having a Mirau reference surface 292, a beam splitter 300 to form a reference beam (not shown) within a probe tip 310 and measurement beam 218, and a 90° turning mirror 314 to direct beam 218 radially to an inner wall 320 (FIGS. 7, 9, and 10) of a bore 326 (FIGS. 9 and 10) such that a reflected portion 330 (FIG. 7) of collimated light 200 is directed toward a remotely located spectral sensor (not shown). In some embodiments, probe 250 supports one to three mm bounce mirror options and other angles. Mirror 314 is removable, or its position is adjustable, along or with tip 310. Thus, the following optical parameters can be controlled: measurement range, working distance, and spot size.

FIG. 8 also shows that rotational motion stage 196 includes a servo rotation motor 334 that performs rotation of an air bearing 336 (also called an air spindle) in response to control signals carried by signal wires 338 from control circuitry (e.g., processing device 272, FIG. 6). Control signals are also provided from stage 196 by a pair of optical encoders 340 that are mutually angularly spaced apart on opposite sides of motor 334. Optical encoders 340 are A4A1X30D10B available from Renishaw plc of Wotton-under-Edge, Gloucestershire. An encoder disk 344 atop motor 334 generates detectable signals for tracking a controllable amount of rotation imparted by motor 334. Encoder disk 344 is an A-9405-4050, which is also available from Renishaw plc.

A magnetic kinematic mount 360 is included for swapping probes 162 on air spindle 336. For example, kinematic mount 360 includes a kinematic base 364 (FIG. 7) having three tooling balls 368 that are mutually angularly spaced apart about a bottom surface 370 of air spindle 336. Kinematic mount 360 also includes a kinematic cap 380 having three pairs of eccentric mounting dowels 384 that are also mutually angularly spaced apart about an upper surface 386 (FIG. 8) of probes 162. Skilled persons will appreciate that kinematic base 364 may be located on probes 162 and kinematic cap 380 may be located on bottom surface 370 of air spindle 336, in another embodiment.

Each eccentric mounting dowel 384 is rotatable about its longitudinal axis to make use of its eccentricity to align optical and rotational axes during a manual configuration step. For example, dowels 384 can adjust the contact point on tooling balls 368 up or down 0.2 mm by rotating it +/−180° using a spanner on the distal end to improve or adjust seating of kinematic cap 380 atop kinematic base 364.

When installed in a five-axis ZeroTouch motion and metrology platform, which is available from DWFritz Automation, Inc. of Wilsonville, Oregon, non-contact optical measurement device 280 enables six degrees of freedom motion and measurement at any point and orientation within the measurement volume. The measurement volume and five-axis motion platform are subjects of U.S. Pat. No. 10,598,521 of Aqui et al., which is assigned to the present applicant, DWFritz Automation. Accordingly, right-angle probe 250 coupled to a so-called gamma rotation axis of rotational motional stage 196 may enhance existing metrology systems, according to one embodiment.

Figure 9:
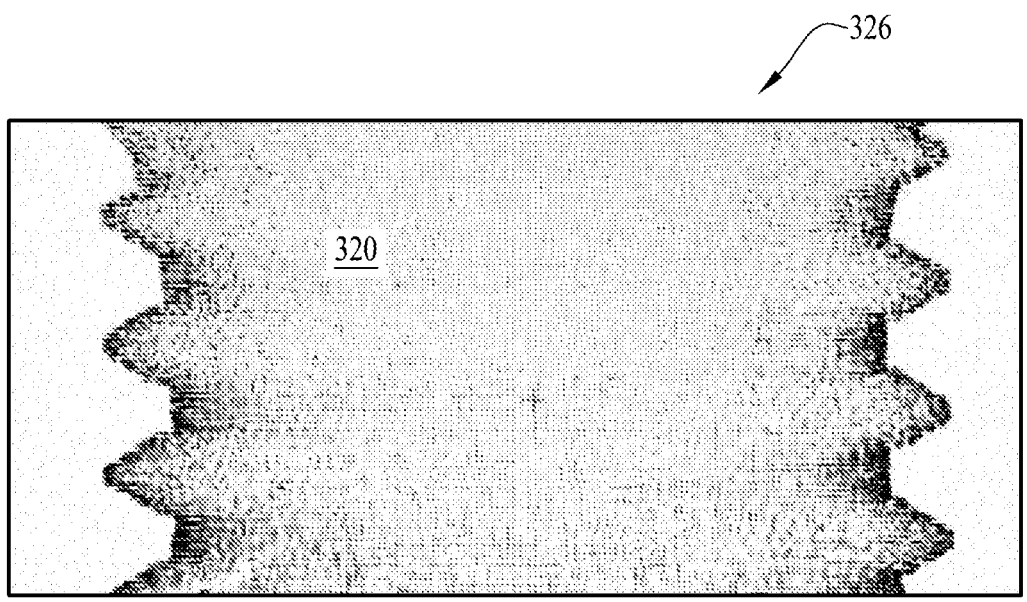
FIGS. 9 and 10 are pictorial views of point clouds represented as images showing M8 screw threads measured using the non-contact optical measurement device configured with the first exchangeable optical probe of FIGS. 7 and 8.
Figure 10:
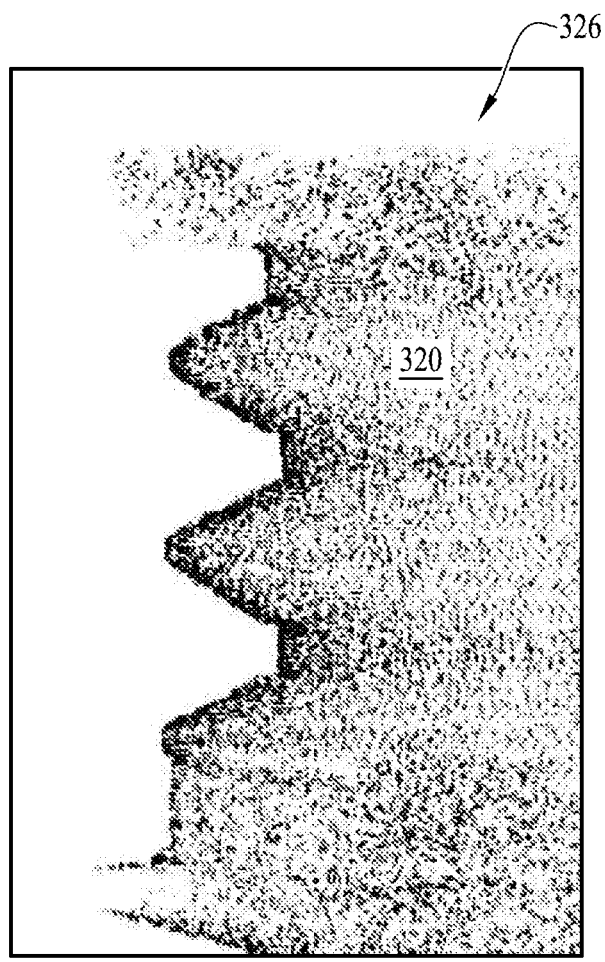

FIGS. 9 and 10 show an example of generating a point cloud in the form of an image generated by processing device 272 (FIG. 6). As probe 250 rotates within bore 326, intensity of reflected light information 276 (FIG. 6) is sampled by sensor 174 and position information 274 is used to determine a spatial location at which a sampled intensity was acquired. Skilled persons will appreciate that various other scanning or image capture techniques may be employed. Various other types of cylindrical geometries, such as bores and other threaded holes, may be imaged using such techniques. Furthermore, it will be appreciated that the controllable amount of rotation imparted to a probe may, in some embodiments, includes no rotation for some detection and measurement tasks. For example, a static probe that need not rotate may include a single confocal sensor for checking a bore depth with beam 214 (FIG. 4).

FIGS. 11 and 12 show non-contact optical measurement device 280 equipped with probe 254. Probe 254 includes a 0° probe tip 400, offset radially by two successive 90° reflections by mirrors 402 in the collimated region of the optical train. Thus, rotation of stage 196 traces a circular path 404 (FIG. 11) to enable rapid two-dimensional scanning when combined with part motion (e.g., fly cutter). This offers several advantages over two-dimensional laser triangulation, including linearity through measurement range, no shadowing, multi-layer thickness measurement capability, smaller spot size, and diameter of scan circle can be set at different distances by the placement of mirrors 402 relative to probe tip 400. For example, various slidable mirrors and tips are contemplated.

FIG. 13 shows an example representation of two-dimensional scanning 416. Tip 400 is rotated to various positions on its circular beam path while surface 420 is moved linearly 422 on a linear motion stage (not shown). Point cloud data uniformity can be controlled through nonlinear angular velocity of probe tip 400 and selective triggering for data acquisition. Redundant data can be avoided as well by selective triggering through the rotation. For example, the numbers in the circles represent a division of the scanned area into odd and even numbered columns as the part is scanned from top to bottom and the probe rotates. Selective triggering enables data collection of the odd numbered columns as it rotates through the upper semicircle and the even numbered columns as it rotates through the lower semicircle. As the part is scanned this would yield a more uniform point cloud density than a constant triggering rate.

FIG. 14 shows an example of scanning a ring gear 440 using probe 260. Probe 260 is similar to probe 254 but includes a 90° probe tip (or other angle) that faces radially outward 448, inward, or at intermediate angles. In general, when scanning a ring gear, a probe is positioned locally perpendicular to teeth that are on a pitch circle with a pressure angle and may not be parallel to the probe rotational axis. Accordingly, two or more probe tips may be deployed for measuring complex geometries.

FIG. 15 shows an example of two-dimensional linear scanning using system 266 including f-theta lens 270, cube beam splitter 470, reference mirror 472, and non-contact optical measurement device 280 equipped with probe 268. Probe 268 includes a 90° scanning mirror 476 at a probe tip 478 located at back focus of f-theta lens 270. Lens 270 thereby acts as single axis galvanometer. Cube beam splitter 470 splits a beam 480 to reference leg 482 reflected from mirror 472 surface and measurement leg 486 reflected from a workpiece surface (not shown). Measurement leg 486 enables rapid two-dimensional scanning when combined with motion of the workpiece surface.

Skilled persons will now appreciate that many changes may be made to the details of the above-described embodiments without departing from the underlying principles of the invention. The scope of the invention should, therefore, be determined by claims and equivalents.

The invention claimed is:

1. A non-contact optical measurement device for detecting or measuring different geometric workpiece features based on configurable light-propagation paths of light emitted from a light source and reflected by a workpiece surface for incidence upon a spectral sensor, the non-contact optical measurement device comprising:

a collimator configured to collimate the light emitted from the light source so as to establish collimated light directed along an optical axis;

a rotational motion stage configured to engender rotational motion about the optical axis;

a rotational motion sensor configured to track a controllable amount of rotation imparted by the rotational motion stage, the controllable amount including 360° or more of free rotation;

a mounting apparatus acting as a common interface for detachably mounting any selected member of a set of exchangeable optical probes to the rotational motion stage and thereby configurably direct the collimated light along a corresponding propagation path as the controllable amount of rotation is imparted to a probe optic configuration of the selected member such that a reflected portion of the collimated light is directed toward the spectral sensor; and a processing device arranged to generate an image or point cloud of a geometric surface based on position information from the rotational motion sensor and spectral information from the spectral sensor, wherein each member of the set of exchangeable optical probes includes a probe optic configuration that is different from those of other members of the set so that the collimated light may be laterally offset from the optical axis, or directed at an angle relative to optical axis, or a combination of both laterally offset and angled, and wherein the rotational and spectral information is acquired using, in seriatim, different members of the set of exchangeable optical probes.

2. The non-contact optical measurement device of claim 1, in which the spectral sensor is non-rotatable in response to the controllable amount of rotation imparted by the rotational motion stage.

3. The non-contact optical measurement device of claim 1, in which the mounting apparatus comprises a kinematic mount.

4. The non-contact optical measurement device of claim 1, in which the mounting apparatus comprises magnetic, mechanical, or vacuum coupling.

5. The non-contact optical measurement device of claim 1, further comprising a member of the set of exchangeable optical probes having an axially aligned probe optics configuration in which the collimated light and the reflected portion share a propagation path aligned along the optical axis.

6. The non-contact optical measurement device of claim 1, further comprising a member of the set of exchangeable optical probes having a mirror to direct the collimated light at an angle relative to the optical axis.

7. The non-contact optical measurement device of claim 6, further comprising an f-theta lens configured to measure planar surface geometry in response to linear scanning of a probe measurement spot and linear motion of the workpiece surface to be measured.

8. The non-contact optical measurement device of claim 1, further comprising a member of the set of exchangeable optical probes having a laterally offset probe optics configuration such that propagation paths of the collimated light and the reflected portions are laterally offset from each other.

9. The non-contact optical measurement device of claim 8, in which the laterally offset probe optics configuration includes two successive 90° reflections configured to measure planar surface geometry in response to coordinated circular scanning of a probe measurement spot and linear motion of the workpiece surface to be measured.

10. The non-contact optical measurement device of claim 8, further comprising a mirror to direct the collimated light at an angle relative to the optical axis, and in which the member of the set of exchangeable optical probes is configured to measure cylindrical surface geometry in response to coordinated circular scanning of a probe measurement spot and linear motion of the workpiece surface to be measured.

11. The non-contact optical measurement device of claim 6, in which the angle is 90°.

12. The non-contact optical measurement device of claim 1, in which the rotational motion stage includes an air bearing.

13. The non-contact optical measurement device of claim 1, in which the rotational motion sensor includes an optical encoder.

14. The non-contact optical measurement device of claim 10, in which the angle is 90°.

* * * * *